United States Patent Office 2,918,438
Patented Dec. 22, 1959

2,918,438

PIGMENT STARCH PAPER COATING COMPOSITION CONTAINING POLYMETHYLOL CARBAMYL POLYAZAALKANE RESINS AND ARTICLE COATED THEREWITH

Daniel D. Ritson, Riverside, and Yun Jen, Stamford, Conn., assignors to American Cyanamid Company, New York, N.Y., a corporation of Maine No Drawing. Application April 11, 1956
Serial No. 577,451

5 Claims. (Cl. 260—17.3)

The present invention relates to fluid pigment-starch coating compositions useful for producing coated paper of improved wet-rub resistance, and to paper coated therewith. More particularly, the present invention relates to such coating compositions containing a small but effective amount of a normally water-soluble thermosetting cationic polyazaalkane resin as supplementary water-resistant adhesive for said starch.

Aqueous pigment-starch coating compositions for paper are widely employed at the present time in the paper industry for the manufacture of glossy paper such as is generally used for magazines, catalogues, book jackets, etc. and for the manufacture of coated paperboard, insulating board and the like. The pigment is generally clay, and the principal function of the starch is to act as adhesive for the pigment.

The principal disadvantage of coated paper containing starch as the adhesive is that the paper possesses practically no wet-rub resistance, and thus the appearance of such paper may be ruined beyond practical repair even by a few drops of water.

Mineral pigment-starch coating compositions for paper are generally formulated to contain 10 to 25 parts by weight of starch per 100 parts of pigment therein, and sufficient water is provided to produce a fluid composition having a suitable viscosity for the application method intended, the solids content of the composition being from about 20% to about 75% by weight. The pigment may be clay, titanium dioxide, lithopone, satin white, blanc fixe, etc. and the principal types of starches used as adhesives are dextrin, oxidized starch, enzyme-converted starch, and chlorinated starch. In addition the compositions usually contain minor amounts of materials added to impart special properties such as an alkali or a phosphate salt to maintain the pigment in deflocculated condition, casein, wax sizes, viscosity decreasing agents such as are shown in U.S. Patents Nos. 2,566,861 and 2,566,862, colored pigments such as ultramarine, perfume, mold growth inhibitors, etc.

A number of such pigment-starch coating compositions and methods for the preparation thereof are disclosed in chapter XVIII of the book "Pulp and Paper" by James P. Casey, vol. II, copyright 1952 by Interscience Publishers, Inc.

U.S. Patent No. 2,399,489, granted on April 30, 1946, to C. G. Landes discloses that coating compositions containing a carbamyl-amine-aldehyde resin such as urea-, thiourea-, melamine-, amelide-, or guanidine-formaldehyde resins possess considerable water resistance when applied to paper. The coating compositions of the patent are acid as required to cause conversion of the resin to water-resistant or hydrophobic form.

Coating compositions having an acid pH, however, are disadvantageous for a number of important reasons. In the first place, low pH retards penetration of the coating composition into the surface of the paper resutling in inferior adhesion. Secondly, coated papers are very commonly employed for offset printing, and acidity retards the rate at which offset inks dry. Thirdly, acid conditions favor flocculation of pigment in the coating composition with undesirable increase in viscosity resulting in decrease of machine speed. Fourthly, acid coating compositions are troublesome to handle in that they tend to cause corrosion of any steel equipment with which they come in contact. Finally, acid-sensitive pigments such as ordinary ultramarine blue are bleached or turned off-color by incorporation in such compositions. The compositions of the present invention are improvements over the compositions of the patent.

The discovery has now been made that aqueous mineral pigment-starch paper-coating compositions are greatly improved by the presence therein of a minor amount of a water-soluble cationic thermosetting polymethylolcarbamyl polyazaalkane resin. We have found that when paper is coated with mineral pigment-starch compositions containing a minor amount of the resin described, the wet-rub resistance of the coated paper after drying is much higher than would otherwise be the case.

It is a principal advantage of coating colors of the present invention that they need not contain any acid catalyst and thus may be applied at an alkaline pH, values up to about 9.5 being fully suitable. Even at the latter value, conversion of the resin to hydrophobic or cured form is so rapid that highly water-resistant coatings are obtainable on normal high-temperature machine cure or after a conventional cure of only a few days at room temperature. The coating is thus fully useful without acid when applied either in conventional manner or on the machine as may be desired. At alkaline pH values the pigment is in well-deflocculated form and acid sensitive pigments such as ultramarine do not deteriorate when blended therewith.

The compositions of the present invention may thus be described as fluid aqueous coating colors comprising a major amount of a paper-coating mineral pigment as principal coating component, a minor amount of a paper-coating starch as principal adhesive for the pigment, and a small but effective amount of a water-soluble cationic thermosetting polymethylolcarbamyl polyazaalkane resin as supplementary adhesive. The pH of the composition preferably but not necessarily is alkaline, and the composition may contain such added components as are customarily present in paper-coating compositions.

The reason why pigment-starch coating compositions become so strongly wet-rub resistant even at an alkaline pH when containing only a small amount of polymethylolcarbamyl polyazaalkane resin is unknown, and we do not wish to be restricted to any particular theory. We point out, however, that this improvement may be associated with the difference in molecular weight of the principal raw material employed. The principal raw material of the resins of the patent are amino constituents (urea, melamine, etc.) having a molecular weight less than 250, whereas the principal raw material of the resins used in making the coating colors of the present invention are polyazaalkanes having molecular weights in excess of, and usually very greatly in excess of 1000. This larger molecular size may be the cause of the superior behavior of the resin at alkaline pH values.

The amount of cationic resin present in coating compositions according to the present invention as supplementary water-resistant adhesive is small. A distinct improvement is noted when the amount of resin is as little as 2½% of the weight of the starch. Evidently, then, there is no amount of resin however small which will not confer at least some improvement. On the other hand, no great additional increase in water-resistance is obtained when the resin becomes the major component of the adhesive. Thus compositions wherein the resin:starch ratio are in excess of 50:50 are not within the scope of the invention. While the amount of cationic resin which need be present in any one instance is primarily determined by the use to which the paper coated therewith will be put, our results to date indicate that greatest improvement in wet-rub resistance conferred per increment of resin present occurs in the range of about 5%–30% of resin based on the weight of the starch, and this range is therefore preferred.

The coating compositions of the present invention may be prepared by forming an aqueous paper-coating starch solution, thoroughly blending therein an aqueous solution of the resin, adjusting the pH of the solution to a value above 6 (the minimum value at which pigment dispersions remain stable) and then mixing the pigment (preferably as a deflocculated aqueous slurry) with the starch solution. Alternatively the pigment slurry and starch may be mixed followed by addition of pigment. The supplementary materials such as viscosity depressants, colorants etc. are best added last. Compositions affording somewhat better wet rub resistance are generally obtained when the resin is added to the starch before the starch is cooked and this is therefore preferred.

The cationic polymethylolcarbamyl polyazaalkane resins referred to above may be prepared in a number of ways. Three principal steps are involved: preparation of a water-soluble polyazaalkane; carbamylation; and conversion of the carbamylated polyazaalkane to thermosetting form by introducing methylol groups.

The polyazaalkanes are high molecular weight polyalkylenepolyamines, and may be prepared in a number of ways. According to one method, a water-soluble alkylenediamine such as ethylenediamine, 1,3-propanediamine, etc. is reacted with an alkylene dichloride such as 1,3-dichloropropane containing not more than 6 carbon atoms or an equivalent mixture of dichloroalkanes. The reaction is advantageously performed in the presence of an acid acceptor and preferably a slight molar excess of amine is used over that theoretically necessary so as to ensure development of a polymer of maximum molecular size. In similar manner an intermediate polyalkylenepolyamine may be employed such as triethylenetetramine, tripropylenetetramine, 3,3'-iminobispropylamine, etc. in place of the alkylenediamines.

Alternatively still, a suitable high molecular weight polyazaalkane may be prepared by homopolymerizing ethylenimine and similar alkylenimines. The corresponding high molecular weight polyalkylenepolyamines are obtained.

The polyazaalkanes become suitable as raw materials for the resins described above when their molecular size is such that their viscosity as 60% aqueous solutions at 25° C. is at least about N on the Gardner-Holdt scale. Results improve as the molecular size of the polyalkylenepolyamine increases, and there is no limit to their maximum molecular size except that of convenience, the range of useful molecular size ending when the polymer is barely pourable. Wet-rub resistance of the applied coating improves rapidly as the viscosity of the polyazaalkane rises. We prefer the minimum viscosity of the polyalkylenepolyamine to be A on the Gardner-Holdt scale as 33% aqueous solutions at 25° C. and in practice we employ polymers having a viscosity of T or more at the same dilution on the same scale.

The polyazaalkanes may be substantially completely straight chained as in the case of polymerized ethylenimine, or may contain 6 membered rings as part of the chain. Rings of this type form when 3,3'-iminobispropylamine is condensed with ethylene dichloride.

The polyalkylenepolyamine chains may carry such substituents as do not interfere with the essential characteristics of basicity and water-solubility. Substituents which may be carried include non-ionic hydrophobic and hydrophilic substituents represented by aryl (phenyl, totyl, xylyl, methoxyphenyl) alkyl (methyl, ethyl, phenethyl); methoxymethyl; and cationic substituents including quaternary ammonium, amine, amide, and hydroxy substituents.

The carbamylation or thiocarbamylation step may be performed by reacting a water-soluble polyazaalkane with urea, thiourea or similar material so as to unite the reagents with evolution of ammonia. The condensation may be performed in a ball mill at 100°–200° C. or with the reagents in aqueous medium at reflux temperature. We have found that generally better carbamylation is obtained by first forming the acid salt of the polyazaalkane and then reacting with a soluble metal cyanate or thiocyanate. The evidence is that the reaction should be carried to at least 25% of theoretical maximum completion, and complete carbamylation appears preferable.

In the third step, the carbamylated or thiocarbamylated polyalkylenepolyamine is reacted with formaldehyde or other suitable aldehyde to form a thermosetting resin.

The particular manner in which the resins are prepared forms no part of the present invention.

The resins are complex and are therefore most conveniently described as resins corresponding to those formed by first reacting a salt of a water-soluble polyalkylenepolyamine having a molecular size such that an aqueous solution containing 60% by weight of resin solids has a viscosity at 25° C. of at least M on the Gardner-Holdt scale, with a material selected from the group consisting of the water-soluble metal cyanates and thiocyanates, and then reacting with sufficient formaldehyde to form a water-soluble thermosetting resin.

The invention will be more particularly described in connection with the examples which follow. These examples illustrate embodiments of the invention and are not to be construed in limitation thereof.

*Example 1*

The following illustrates the manufacture of a series of coating compositions according to the present invention and the preparation of coated paper of high wet-rub resistance therewith.

The thermosetting resin was prepared by reacting 31.7 parts of ethylene dichloride and 53.1 parts of 3,3'-iminobispropylamine in 20.2 parts of water, the temperature being controlled so that it slowly rose to reflux. When reaction of the ethylene dichloride was complete, the reaction mixture was cooled to 35° C. and 81.2 parts of water and 65.4 parts of 32% HCl were slowly added, the exotherm being controlled by cooling. The mixture was again cooled to 35° C. and 104 parts of KCNO added and the mixture maintained at 70° C. for 30 minutes. There were then added 112 parts of water and 197 parts of 37% formalin and the mixture allowed to react at 75° C. for 90 minutes after which 335 parts of water were added and the mixture cooled to 30° C. to stop the reaction. The resulting aqueous solution had an alkaline pH.

Four batches of clay slurry were prepared by vigorously agitating 503 parts of a kaolinite paper coating clay in 230 parts of slightly alkaline water containing 1 part of tetrasodium pyrophosphate and 0.5 parts of sodium carbonate as deflocculating agents.

Four adhesive solutions were prepared by cooking paper coating chlorinated starch at 190° F. for 20 minutes, the cationic resin where present being added at the start of the cook, the cook pH being 8.5. The composition of the adhesives is shown in the table.

The coating colors were formed by stirring the clay dispersions into the adhesive compositions thus prepared and stirring for one hour. The pH values and Brookfield viscosities of the colors were determined and are shown in the table below.

The coating colors thus obtained were coated on a 50-lb. basis weight sulfide-soda raw stock at a coating weight of about 15 lbs. per ream using a laboratory doctor blade coater. Sheets were dried as shown in the table below, calendered, and their gloss, wax pick and wet-rub values determined.

The wet-rub values were determined by the finger method wherein the coated sheet is laid flat with black paper underlying one edge. The edge is firmly rubbed under uniform pressure three times with a moist thumb in an effort to rub coating color from the coated paper to the black sheet. A value of 0 designates a coating which has no wet-rub resistance, practically all of the coating being subject to removal in this manner. A value of 10 designates a substantially completely wet-rub resistant coating, the value indicating that practically none of the coating could be rubbed off in the manner described. Intermediate values designate intermediate results.

Results were as follows.

| Coating Color | Control | A | B | C |
|---|---|---|---|---|
| Clay slurry, g.[1] | 734.5 | 734.5 | 734.5 | 734.5 |
| Adhesive: | | | | |
| Coating starch (89.9%), g | 100.5 | 100.5 | 100.5 | 100.5 |
| Water, cc | 240.0 | 218.6 | 207.3 | 196.0 |
| Resin (15%), g | Nil | 30.0 | 45.0 | 60.0 |
| Total weight, g | 1,075.0 | 1,083.6 | 1,087.3 | 1,091.0 |
| Percentages: | | | | |
| Total solids, percent | 55 | 55 | 55 | 55 |
| Starch on clay, percent | 18 | 18 | 18 | 18 |
| Resin on starch, percent | Nil | 5 | 7.5 | 10 |
| Coating Color-Properties: | | | | |
| pH | 7.6 | 8.0 | 8.1 | 8.1 |
| Visc (Brkfld., 100 r.p.m.) | 1,440 | 5,000 | 5,700 | 6,040 |
| Coated Paper-Properties: | | | | |
| Gloss (Ingersoll) | 39 | 38 | 38 | 40.5 |
| Wax pick test (Dennison) | 6.5 | 8 | 8 | 8.5 |
| Wet Rub Test: Oven dry (1 min. at 300° F.) | 0 | 8 | 10 | 10 |
| Air Dry: | | | | |
| Initial | 0 | 4 | 4 | 4 |
| 3 days | 0 | 6 | 9 | 10 |
| 1 week | 0 | 6 | 10 | 10 |
| 2 weeks | 0 | 7 | 10 | 10 |

[1] For composition see text above.

The table shows that the control coating possessed no water resistance regardless of the temperature at which the paper was dried. Run A shows that the presence of only a very minor amount of the cationic resin (5% on the weight of the starch or 1% on the weight of the clay) caused a significant increase in the wet-rub resistance both in the case of the oven-dried paper and in the case of paper which had been merely air dried.

Runs B and C show that 7.5% and 10% of the resin gave coatings which received maximum ratings. The table further shows a very beneficial increase in wax pick values resulting from presence of the resin and demonstrates that the foregoing improvements were obtained without any significant sacrifice to gloss.

It is known as a result of subsequent work that comparable results are obtained when the pH is increased to as much as 9.5 due to the presence of calcium carbonate as part of the pigment.

*Example 2*

Carton raw stock of 20 mil. thickness was coated with composition C of Example 1 by the method therein disclosed, dried at 240° F. in an oven and stored for three days. The initial wet-rub resistance was 5 and the value at the end of three days was 10, showing that the compositions of the present invention are as useful in coating paper board as in coating paper.

We claim:

1. A fluid aqueous composition useful for providing cellulose webs with coatings of improved wet-rub resistance, comprising a major amount of a paper-coating mineral pigment as principal coating component, a minor amount of a paper coating starch as principal adhesive for said pigment, and a small but effective amount of a water-soluble cationic thermosetting polymethylolcarbamyl polyazaalkane resin as supplementary adhesive.

2. A composition according to claim 1 wherein the pH of said composition is between 7 and 9.5.

3. A composition according to claim 1 wherein the paper-coating mineral pigment comprises calcium carbonate.

4. A water-laid cellulosic web coated on at least one side with a composition according to claim 1.

5. A web according to claim 4 wherein the cationic resin is in thermoset form.

References Cited in the file of this patent

UNITED STATES PATENTS

| 2,555,057 | Porter et al. | May 29, 1951 |
| 2,616,874 | Yost et al. | Nov. 4, 1952 |

FOREIGN PATENTS

| 474,601 | Great Britain | Apr. 1, 1937 |